United States Patent [19]
Brady et al.

[11] Patent Number: 6,166,638
[45] Date of Patent: Dec. 26, 2000

[54] RF/ID TRANSPONDER WITH SQUINTED BEAM RADIATION PATTERN USING DIPOLE-OVER-GROUND PLANE ANTENNA

[75] Inventors: Michael John Brady, Brewster; Dah-Weih Duan, Yorktown Heights, both of N.Y.

[73] Assignee: Intermec IP Corp., Woodland Hills, Calif.

[21] Appl. No.: 09/286,121

[22] Filed: Apr. 2, 1999

Related U.S. Application Data

[60] Provisional application No. 60/080,702, Apr. 3, 1998.

[51] Int. Cl.[7] .................................................. G08B 13/14
[52] U.S. Cl. ..................... 340/572.7; 340/10.1; 343/754; 343/793; 343/795; 342/360
[58] Field of Search ............................... 340/572.7, 10.1; 342/42, 44, 360, 361; 343/754, 795, 726, 834, 793

[56] References Cited

U.S. PATENT DOCUMENTS

| | | | |
|---|---|---|---|
| 4,104,630 | 8/1978 | Chasek | 342/44 |
| 5,012,256 | 4/1991 | Maddocks | 343/754 |
| 5,198,821 | 3/1993 | Skrzypczak | 342/360 |
| 5,376,943 | 12/1994 | Blunden et al. | 343/795 |
| 5,497,140 | 3/1996 | Tuttle | 340/10.1 |
| 5,497,168 | 3/1996 | Thomas et al. | 343/834 |
| 5,552,790 | 9/1996 | Gunnarsson | 342/51 |
| 5,572,226 | 11/1996 | Tuttle | 343/726 |
| 5,621,571 | 4/1997 | Bantli et al. | 359/529 |
| 5,719,586 | 2/1998 | Tuttle | 343/726 |
| 5,767,789 | 6/1998 | Afzali-Ardakani et al. | 340/10.1 |
| 5,776,278 | 7/1998 | Tuttle et al. | 156/213 |
| 5,779,839 | 7/1998 | Tuttle et al. | 156/213 |
| 5,867,130 | 2/1999 | Tay et al. | 343/795 |
| 5,976,038 | 11/1999 | Orenstein et al. | 473/467 |
| 6,089,458 | 8/2000 | Lake | 235/488 |

OTHER PUBLICATIONS

"Horizontal Antennas Above Real Ground" by Ralph Holland, Amateur Radio 1996.
"Horizontal Half–Wave Dipole Above A Counterpoise" by Ralph Holland, Amateur Radio 1996.
"Linear Antenna": far–field pattern of 1.5 lambda center–fed dipole antenna (Figure 14–27b), John D. Kraus, Electromagnetics, 3rd edition, copyright 1987 by McGraw–Hill, Inc. pp. 657–658.

*Primary Examiner*—Benjamin C. Lee
*Attorney, Agent, or Firm*—O'Melveny & Myers LLP

[57] ABSTRACT

An RF/ID transponder comprises an integrated circuit package including at least a memory and an RF modulator. A dipole antenna is coupled to the RF modulator, and has a length greater than one-half wavelength of an electromagnetic wave having a nominal frequency within an operating frequency band of the RF modulator. A base plate provides an electrically conductive ground plane, and a housing is attached to the base plate. The integrated circuit package and the dipole antenna are supported by the housing at a predetermined distance from the conductive ground plane. Thereby, the dipole antenna provides a radiation pattern that includes at least first and second squinted beams extending at respective acute angles relative to a vector defined normal to the conductive ground plane, and at least one center beam extending along the vector defined normal to the conductive ground plane. In a preferred embodiment of the invention, the length of the dipole antenna is approximately one and one-half wavelengths at the nominal frequency, and the housing supports the dipole antenna above the conducting ground plane at a distance of approximately 6 to 12 percent of a wavelength of the nominal frequency.

27 Claims, 6 Drawing Sheets

RF/ID TRANSPONDER WITH SQUINTED BEAM RADIATION PATTERN USING DIPOLE-OVER-GROUND PLANE ANTENNA

CROSS-REFERENCE TO RELATED APPLICATION

This application claims the benefit of U.S. Provisional Application Number 60/080,702, filed Apr. 3, 1998, which application is specifically incorporated herein by reference in its entirety.

BACKGROUND OF THE INVENTION

1. Field of the Invention

The present invention relates to radio frequency identification (RF/ID) systems, and more particularly, to an RF/ID transponder using a dipole-over-ground plane antenna adapted to provide a radiation pattern including squinted beams that can be detected by an interrogator from a lateral orientation relative to the RF/ID transponder.

2. Description of Related Art

In the automatic data identification industry, the use of RF/ID transponders (also known as RF/ID tags) has grown in prominence as a way to track data regarding an object on which an RF/ID transponder is affixed. An RF/ID transponder generally includes a semiconductor memory in which information may be stored. An RF/ID interrogator containing a transmitter-receiver unit is used to query an RF/ID transponder that may be at a distance from the interrogator. The RF/ID transponder detects the interrogating signal and transmits a response signal containing encoded data back to the interrogator. RF/ID systems are used in applications such as inventory management, security access, personnel identification, factory automation, automotive toll debiting, and vehicle identification, to name just a few.

Such RF/ID systems provide certain advantages over conventional optical indicia recognition systems (e.g., bar code symbols). For example, the RF/ID transponders may have a memory capacity of several kilobytes or more, which is substantially greater than the maximum amount of data that may be contained in a bar code symbol. The RF/ID transponder memory may be re-written with new or additional data, which would not be possible with a printed bar code symbol. Moreover, RF/ID transponders may be readable at a distance without requiring a direct line-of-sight view by the interrogator, unlike bar code symbols that must be within a direct line-of-sight and which may be entirely unreadable if the symbol is obscured or damaged. An additional advantage of RF/ID systems is that several RF/ID transponders may be read by the interrogator at one time.

Often it is desirable to place an RF/ID transponder on a horizontal surface facing upward, such as on a cargo container or warehouse pallet, etc. In such applications, the radiation pattern emitted from the antenna of the RF/ID transponder extends normal to the horizontal plane, or straight upward. This orientation renders the RF/ID transponder difficult to detect from an interrogator that approaches the RF/ID transponder from the side, such as an interrogator that is mounted on a fork lift vehicle operating in a warehouse. In such an example, the interrogator will not detect the RF/ID transponder until it is literally right on top of the transponder. Since the effective reading range of the RF/ID transponder is reduced, the utility of the RF/ID system is substantially diminished. Consequently, it would be very desirable to develop an RF/ID transponder having an antenna radiation pattern that includes an angular region permitting detection by an interrogator approaching from the side.

SUMMARY OF THE INVENTION

In accordance with the teachings of the present invention, an RF/ID transponder is disclosed that provides an antenna radiation pattern that includes at least three distinct high gain beams. The high gain beams further include at least two squinted beams that extend in angular directions permitting detection by an RF/ID interrogator from an increased read distance.

More particularly, an embodiment of the RF/ID transponder further comprises an integrated circuit package including at least a memory and an RF modulator. A dipole antenna is coupled to the RF modulator, and has a length greater than one-half wavelength of an electromagnetic wave having a nominal frequency within an operating frequency band of the RF modulator. A base plate provides an electrically conductive ground plane, and a housing is attached to the base plate. The integrated circuit package and the dipole antenna are supported by the housing at a predetermined distance from the conductive ground plane. Thereby, the dipole antenna provides a radiation pattern that includes at least first and second squinted beams extending at respective acute angles (e.g., 45°) relative to a vector defined normal to the conductive ground plane, and at least one center beam extending along the vector defined normal to the conductive ground plane. In a preferred embodiment of the invention, the length of the dipole antenna is approximately one and one-half wavelengths of the nominal frequency, and the housing supports the dipole antenna above the conducting ground plane at a distance of approximately 6 to 12 percent of a wavelength of the nominal frequency.

A more complete understanding of a RF/ID transponder with squinted beams using a dipole-over-ground plane antenna will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the need for an RF/ID transponder having an antenna radiation pattern that includes an angular region permitting detection by an interrogator approaching from the side. In the detailed description that follows, like element numerals are used to describe like elements illustrated in one or more of the figures.

Figure 1:
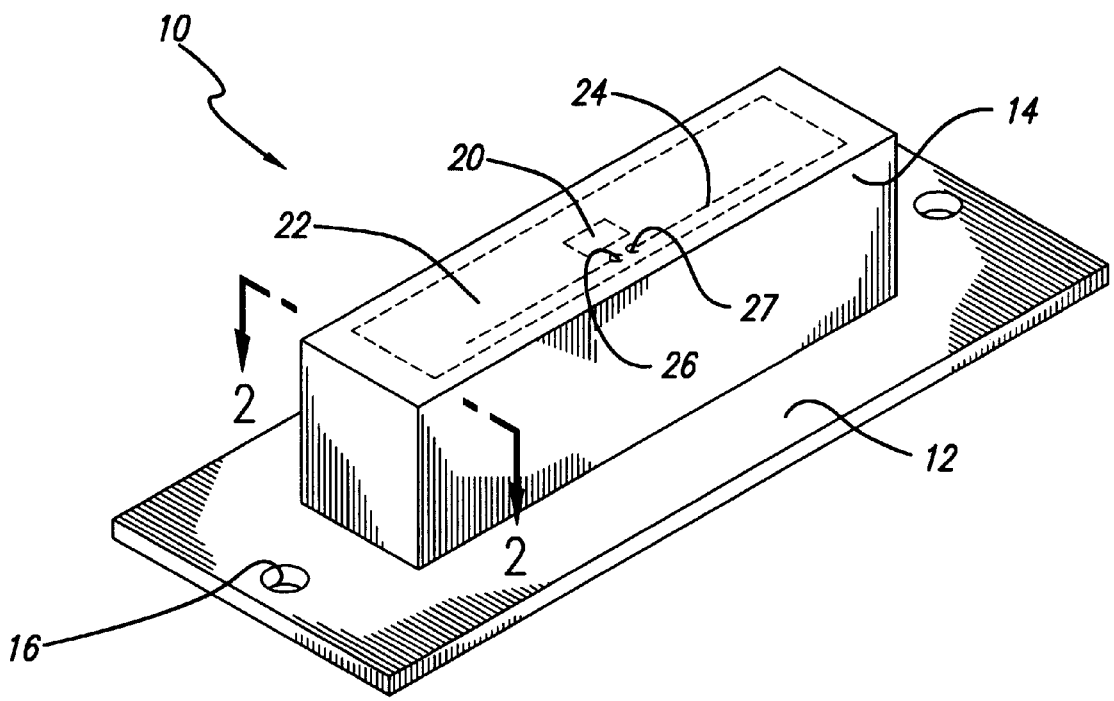
FIG. 1 is an isometric view of an exemplary RF/ID transponder having a dipole-over-ground plane antenna in accordance with the present invention.
Figure 2:
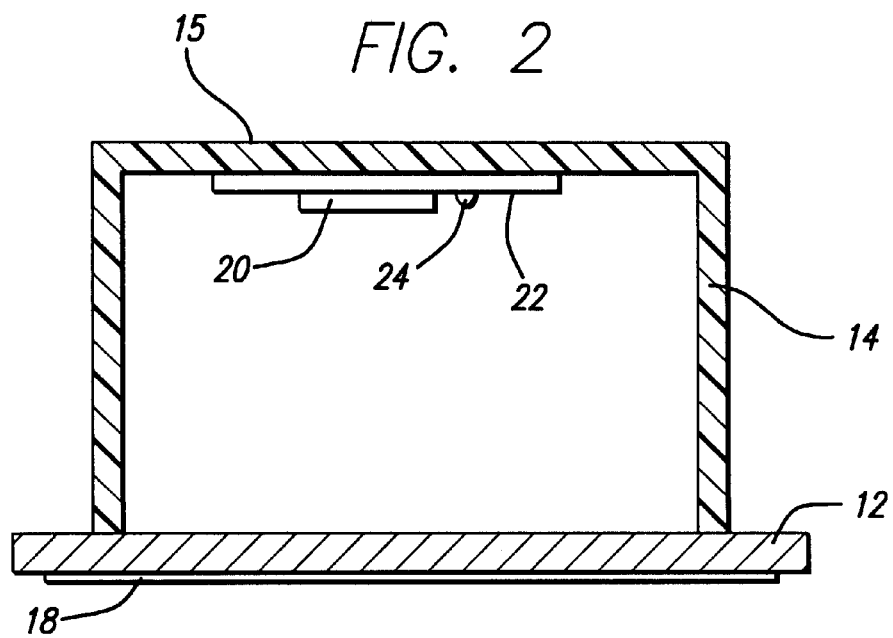
FIG. 2 is a cross-sectional view of the RF/ID transponder of FIG. 1.

Referring first to FIGS. 1 and 2, an RF/ID transponder 10 in accordance with an exemplary embodiment of the present invention is shown. As will be further described below, the RF/ID transponder 10 utilizes a "dipole-over-ground plane" (DOG) antenna structure that allows the RF/ID transponder to be placed on metal or RF absorbing surfaces and to be read over an increased range as compared to an RF/ID transponder employing a conventional tuned dipole antenna. The RF/ID transponder 10 is adapted to communicate with an RF/ID system via a base unit or a handheld interrogator (see FIGS. 7 and 8). An example of the RF/ID transponder 10 is provided by co-pending patent application Ser. No. 09/188,089, filed Nov. 6, 1998, for "RFID Tag Having Dipole Over Ground Plane Antenna," which is incorporated by reference herein.

More particularly, the RF/ID transponder 10 comprises an integrated circuit package 20 that includes an RF modulator circuit, logic circuits, and memory. As shown in FIGS. 1 and 2, the integrated circuit package 20 is provided on a substrate 22, though a substrate may not be necessary for the integrated circuit package. A dipole antenna 24 is also provided on the substrate 22, and is coupled to the integrated circuit package 20 at terminals 26, 27. Suitable materials for the substrate 22 may include polyester, polyimide, ceramics, FR-4 epoxy, phenolic, and other dielectric materials. The integrated circuit package 20 preferably comprises a semiconductor chip encapsulated within a plastic-molded package 110, such as a single in-line package (SIP), dual in-line package (DIP), flat-pack, small outline IC (SOIC), small outline package (SOP), or mini small outline package (MSOP). The integrated circuit package 20 may further include a plurality of external leads or pins which are connected to the semiconductor chip via conventional techniques (such as wire bonding or the like). For example, two of the leads may provide the terminals 26, 27 that connect the integrated circuit package 20 to the dipole antenna 24 formed on the substrate 22. Alternatively, the integrated circuit package 20 may be directly mounted to the substrate 22 and bonded to the dipole antenna 24. The integrated circuit package 20 may be coated with an encapsulant, such as a "glob-top" epoxy, or the like and/or laminated with a laminate to protect the package (and bond points with the dipole antenna) from damage.

Preferably, the dipole antenna 24 comprises thin (i.e., 18 to 35 micron thickness) lines integrally formed on the substrate 22 of a conductive metal, such as copper. These lines may be formed using conventional techniques, such as plating, adhering or screening of a thin layer of conductive metal onto the substrate 22. The thin layer of conductive metal may then be etched to form the specific geometric configuration of the dipole antenna 24 (i.e., simple dipole, folded dipole, meander dipole, etc.). As will be further described below, it is desirable to closely match the impedance of the dipole antenna 24 to the integrated circuit package 20 in order to maximize signal coupling between the dipole antenna and the integrated circuit package.

The substrate 22 is disposed within a non-conducting support housing 14 at a fixed distance from a base plate 12. As shown in FIG. 2, the support housing 14 may comprise a hollow shell having a generally rectangular cross-section, though other shapes such as trapezoidal, round, or triangular can also be utilized for the support housing. The support housing 14 further includes side walls attached and sealed to the base plate 12 via an adhesive, sealant, or the like. Preferably, the substrate 22 is placed within the support housing 14 and attached to an inner surface of an outer wall 15 so that the dipole antenna 24 is held generally parallel to the base plate 12. The substrate 22, including the integrated circuit package 20 and dipole antenna 24, is preferably sealed within the support housing 14 when attached to the base plate 12, and is thereby protected from environmental contaminants.

The base plate 12 is comprised of electrically conductive materials to form a conducting ground plane. In this manner, the dipole antenna 24 is suspended over and held generally parallel to the conducting ground plane. The base plate 12 which provides the ground plane may be rectangular in shape and may be attached to a metal or RF absorbing surface using a fastener 18 such as an adhesive, double-sided tape, or hook and loop fastener material, or, alternatively, may be attached using rivets or bolts (via holes 16), or the like. When attached to the metal or RF absorbing surface, the bottom of the base plate 12 abuts the surface so that the substrate 22 is held away from the surface by the support housing 14. Preferably, the base plate 120 is comprised of an electrically conductive material, such as metal (i.e., aluminum, steel, brass, titanium, copper, etc) or a metallized material (i.e., a metallized plastic, mesh, screen, etc). The substrate 22 may be attached to a surface within the support housing 14 via a fastener such as an adhesive, double-sided tape, rivets, "snap-on" molded plastic tabs, or the like. The support housing 14 may be attached to the base plate 12 via a fastener such as an adhesive, rivets, bolts, etc., and sealed to keep out environmental contaminants. Preferably, the support housing 14 is made of an RF transparent, non-conducting material, such as polypropylene plastic.

As known in the art, the RF/ID transponder 10 may be "active" meaning that the transponder 102 includes an internal transmitter for transmitting information to an interrogator or base station (not shown), or "passive" meaning that the transponder uses a modulated back scattered RF field (generated by the interrogator or base station) to provide a return signal to provide the information. In addition, the RF/ID transponder 10 may be field powered, or alternatively, may be at least partially battery powered. Field powered transponders collect power from the RF field generated by the interrogator or base station and convert the collected power to a dc voltage which is stored in a capacitor to provide power for operating the transponder's other circuitry. Battery powered transponders typically employ a coin-shaped battery (not shown) mounted to the substrate 22 and electrically connected to the integrated circuit package 20.

An advantage of the dipole-over-ground plane (DOG) antenna structure is that at a suitable standoff distance, the radiation resistance of a resonant dipole (i.e., about 73 ohms) is reduced to a lower value (i.e., about 10 ohms). Preferably, this lower resistance value is close to the resistance of the integrated circuit package 20 measured at the terminals 26, 27, providing a good starting point for impedance matching which may be perfected by other impedance adjustment elements (i.e., tuning stubs, loading bars, impedance matching circuits, etc.). Since the dipole antenna 24 radiates RF energy with equal amplitude in directions radially outward from an axis defined by the dipole, the ground plane reflects a portion of the RF energy radiated by the dipole antenna 24 back toward the dipole antenna. By selecting the effective electrical path length between the dipole and the ground plane, the gain and the radiation resistance of the dipole antenna can be controlled. More particularly, the dipole antenna and its image in the ground plane are in anti-phase. Therefore, the radiation resistance is lowered because the mutual impedance of the dipole image is subtracted from the self-impedance of the dipole antenna.

As will be further described below, the dipole antenna 24 has a length equivalent to greater than one-half wavelength (λ/2) of an electromagnetic wave having a nominal frequency within an operating band of the RF/ID transponder, and in a preferred embodiment of the invention the length is equivalent to one and one-half wavelengths (3λ/2). The support housing 14 suspends the dipole antenna 24 by a distance approximately one-tenth of a wavelength (λ/10) above the conductive ground plane, and in a preferred embodiment of the invention the distance is approximately 6 to 12% of a wavelength (λ). The base plate 120 may have a length dimension greater than the dipole antenna length.

Figure 3:
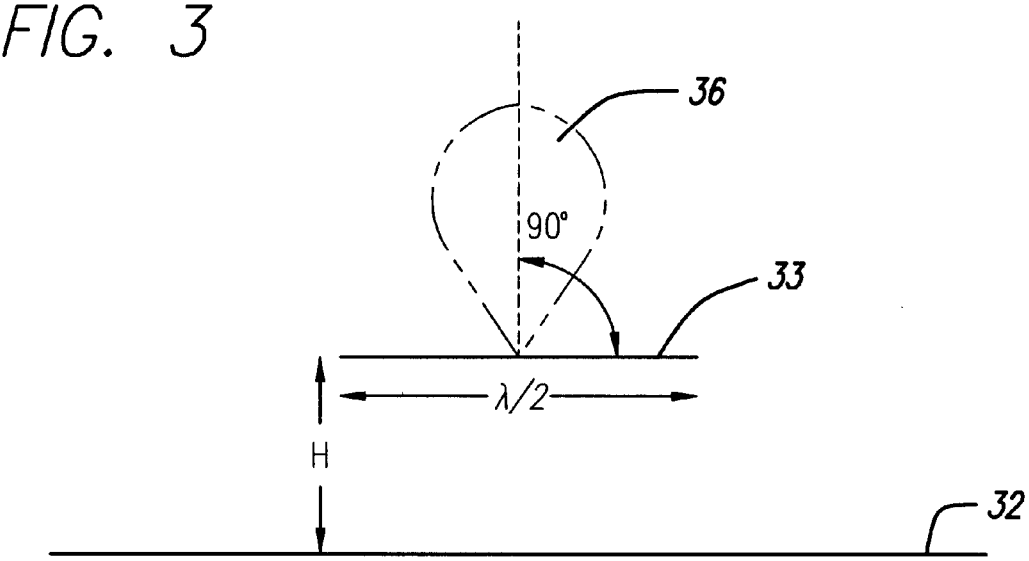
FIG. 3 is a side view of a radiation pattern provided by a half-wavelength dipole-over-ground plane antenna.

Referring now to FIG. 3, a side view of a radiation pattern provided by a half-wavelength dipole-over-ground plane antenna is illustrated. A dipole antenna 33 having a length equivalent to one-half wavelength (λ/2) is shown spaced from a conductive ground plane 32 by a distance H approximately one-tenth of a wavelength (λ/10). This arrangement of the dipole antenna 33 relative to the ground plane 32 results in a radiation pattern including a main beam 36 extending opposite from the direction of the ground plane. The RF energy of the main beam 36 is substantially centered on a radial vector normal to the center of the dipole antenna. Therefore, a horizontally mounted RF/ID transponder constructed in accordance with the embodiment of FIGS. 1 and 2, and having the dipole length and spacing as described above with respect to FIG. 3, would have a radiation pattern that extends substantially upward from the support housing 14. Consequently, an interrogator attempting to interrogate the exemplary RF/ID transponder would likely not detect the transponder until it is within the radiation pattern centered above the transponder.

Figure 4:
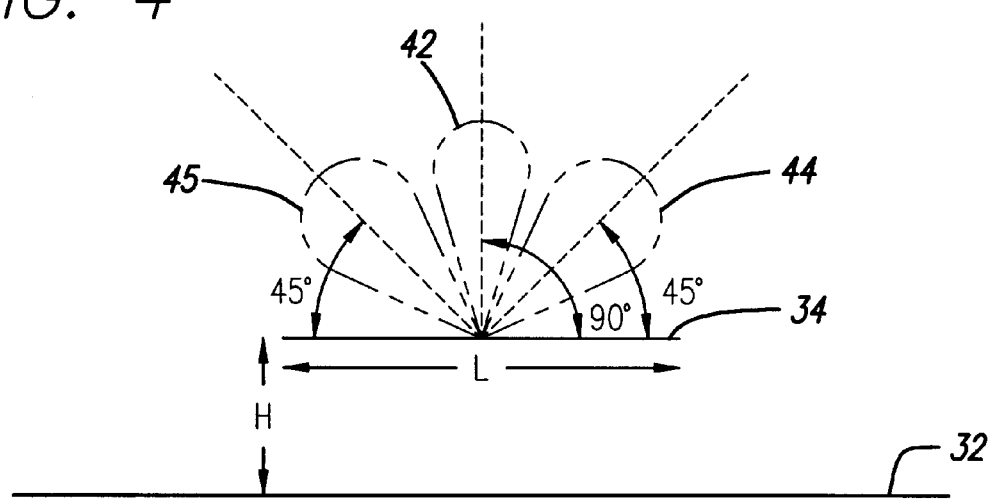
FIG. 4 is a side view of a radiation pattern including squinted beams provided by a dipole-over-ground plane antenna constructed in accordance with the present invention.

Referring now to FIG. 4, a side view of a radiation pattern provided by a dipole-over-ground plane antenna in accordance with the invention is illustrated. A dipole antenna 34 having a length L is shown spaced from a conductive ground plane 32. As in FIG. 3, the distance H is approximately one-tenth of a wavelength (λ/10); however, the length of the dipole is increased to greater than one-half wavelength (λ/2). In a preferred embodiment of the invention, the length of the dipole is increased to one and one-half wavelengths (3λ/2). This arrangement of the dipole antenna 34 relative to the ground plane 32 results in a radiation pattern that includes two squinted beams 44, 45 having RF energy that is directed respectively at acute angles to the left and right of the radial vector normal to the center of the dipole antenna. It is anticipated that the acute angles be approximately 45°. In addition, a center beam 42 is also formed which is substantially centered on a radial vector normal to the center of the dipole antenna, in the same manner as the main beam 36 of FIG. 3.

With a dipole antenna length of one and one-half wavelengths (3λ/2), the center beam 42 has less gain than either of the two squinted beams 44, 45 but nevertheless still constitutes a high gain beam that yields a detectable RF signal. By reducing the dipole antenna length to less than one and one-half wavelengths (3λ/2), but greater than one-half wavelength (λ/2), the gain of the center beam 42 will become greater than either of the two squinted beams 44, 45. It should be further appreciated that by increasing the length of the dipole antenna 34 to two and one-half wavelengths (5µ/42), a radiation pattern that includes four squinted beams and a center beam would be formed. As in the foregoing embodiment, the squinted beams would lie at acute angles to the left and right of the radial vector normal to the center of the dipole antenna, such as at approximately 300° and 600°. Thus, it should be appreciated that the gain and direction of the squinted beams can be controlled through selection of the length of the dipole antenna 34, and the total number of beams (i.e., both squinted and center beams) relates directly to the number n of odd multiples of one-half wavelength (nµ/42).

Figure 5A:
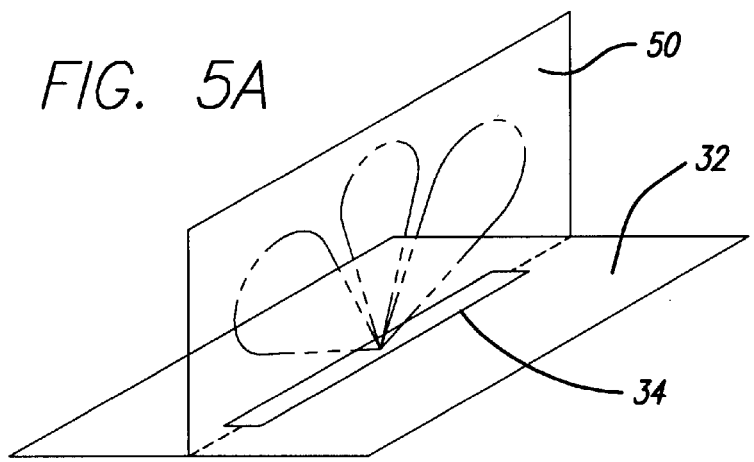
FIGS. 5A–5C are perspective views of the present dipole-over-ground plane antenna illustrating the radiation pattern from plural azimithal projections.
Figure 5B:
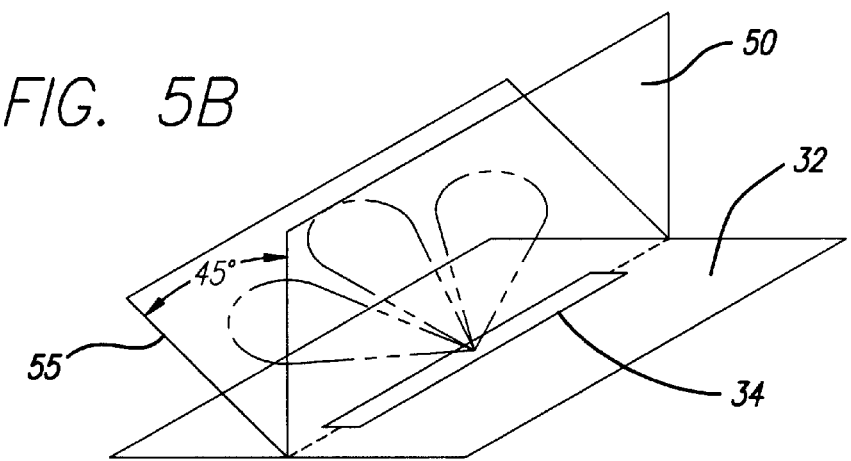
Figure 5C:
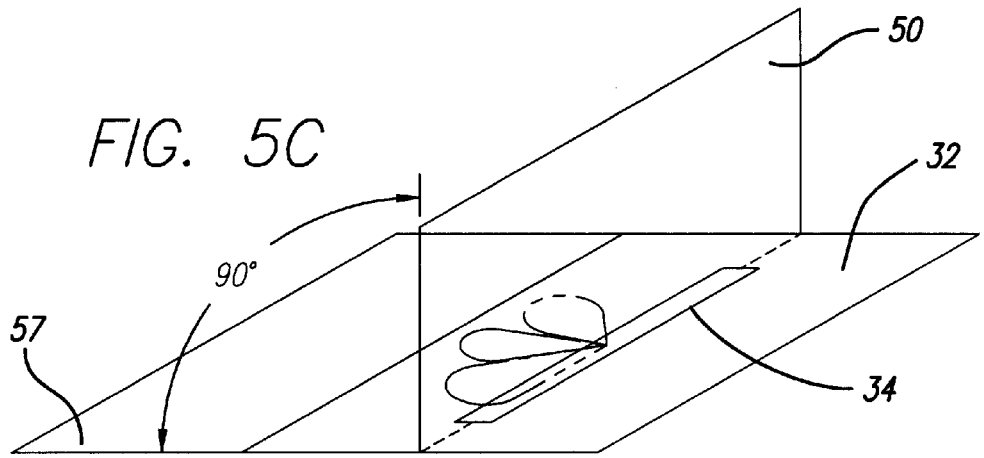
Figure 6A:
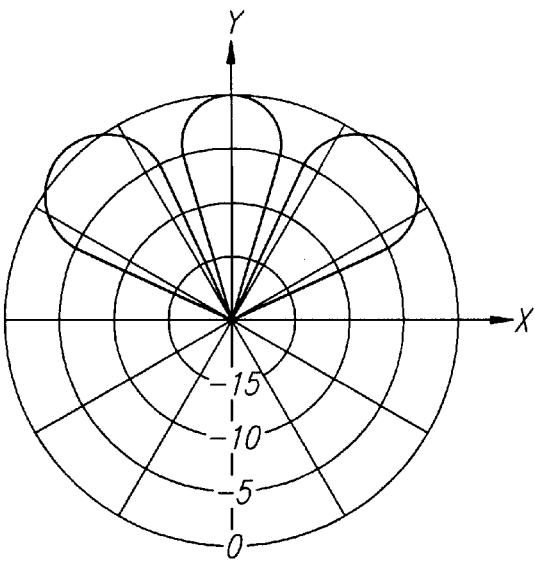
FIGS. 6A–6C are polar plots illustrating the radiation pattern as viewed from the plural azimithal projections of FIGS. 5A–5C, respectively.
Figure 6B:
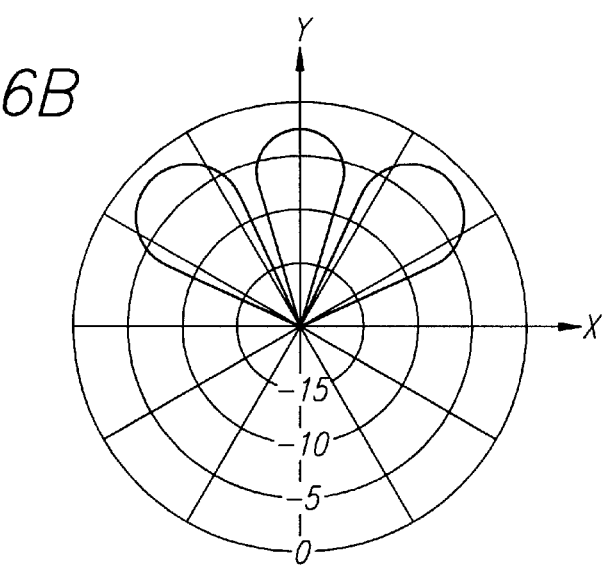
Figure 6C:
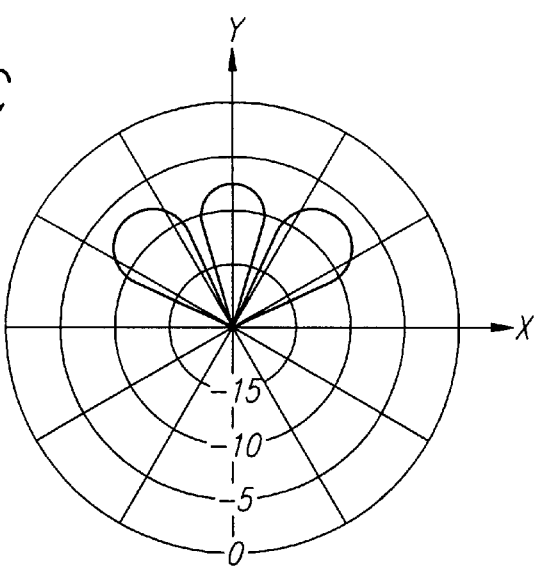

Referring to FIGS. 5A–5C and 6A–6C, the radiation pattern of the dipole-over-ground plane antenna is illustrated in greater detail. FIGS. 5A–5C show the dipole 34 spaced from the ground plane 32 in the manner described above with respect to FIG. 4. In FIG. 5A, an imaginary plane 50 is defined perpendicular to the ground plane and intersects with the dipole antenna 34. A slide of the radiation pattern of the dipole-over-ground plane antenna is shown projected onto the imaginary plane 50. FIG. 6A shows a polar plot of the same slice of the radiation pattern from FIG. 5A, and illustrates the gain of the squinted and center beams. Next, in FIG. 5B, a second imaginary plane 55 is defined at an azimuth of 450 to the first imaginary plane and intersects with the dipole antenna 34. A slice of the radiation pattern of the dipole-over-ground plane antenna is shown projected onto the second imaginary plane 55. FIG. 6B shows a polar plot of the same slice of the radiation pattern from FIG. 5B, and shows that the gain of the center beam and squinted beams has dropped by approximately 3 dB from the boresight view (i.e., perpendicular to the ground plane). Lastly, in FIG. 5C, a third imaginary plane 57 is defined at an azimuth of 90° to the first imaginary plane (i.e., parallel with the ground plane 32) and intersects with the dipole antenna 34. A slice of the radiation pattern of the dipole-over-ground plane antenna is shown projected onto the third imaginary plane 57. FIG. 6C shows a polar plot of the same slice of the radiation pattern from FIG. 5C, and shows that the gain of the center beam and squinted beams has dropped by approximately 8 dB. These figures show that the radiation pattern gradually tapers as the azimuthal observation angle moves from the normal to the ground plane towards ±90°.

Figure 7:
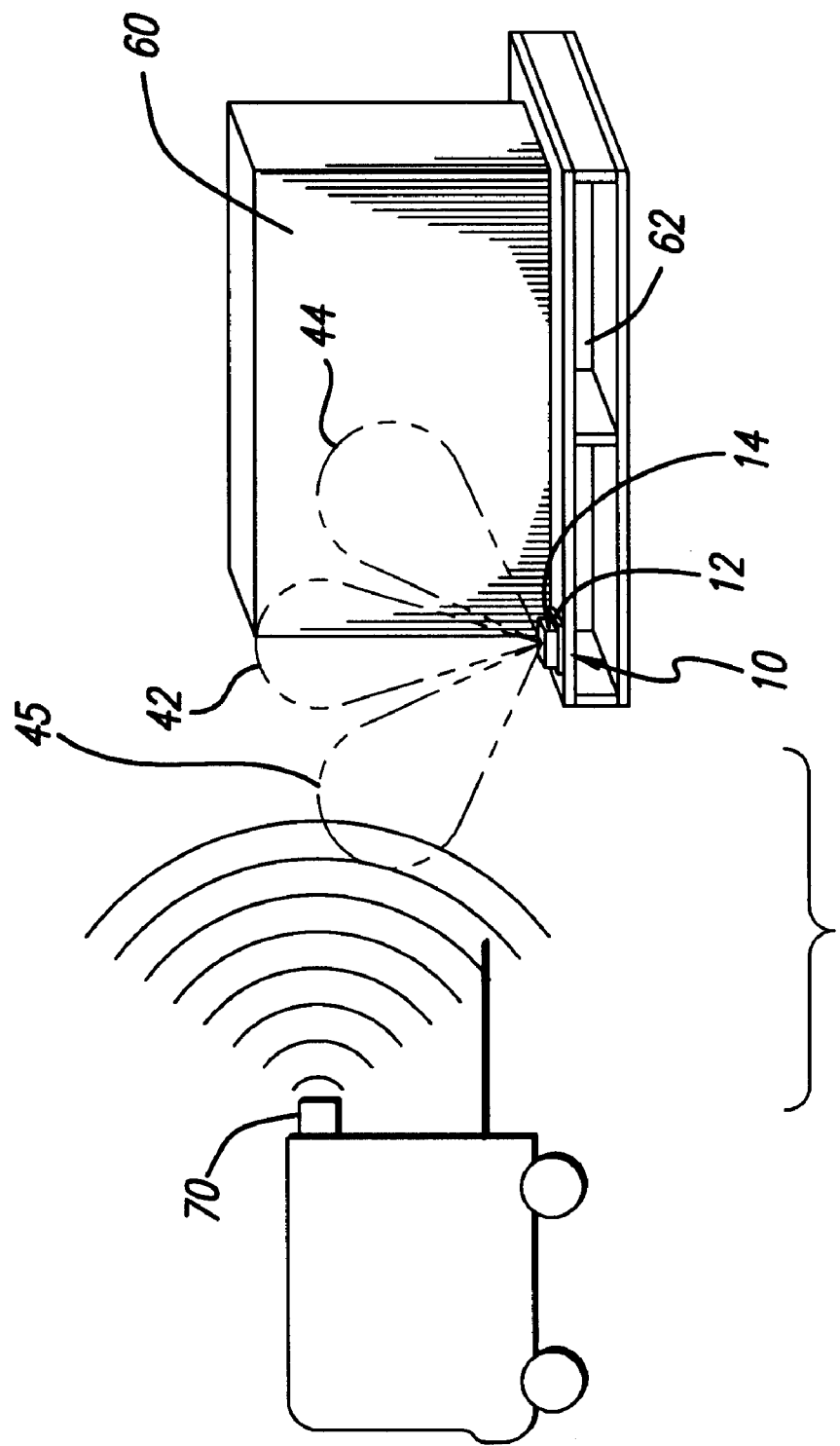
FIG. 7 is a perspective view of an RF/ID system including a horizontally mounted RF/ID transponder being interrogated by an RF/ID interrogator from a side orientation.

It should be appreciated that a horizontally mounted RF/ID transponder constructed in accordance with the embodiment of FIGS. 1 and 2, and having the dipole length and spacing as described above with respect to FIG. 4, would have a radiation pattern that extends substantially sideways from the support housing 14, as well as upward from the support housing. As shown in FIG. 7, an interrogator attempting to interrogate the exemplary RF/ID transponder would detect the RF/ID transponder as the RF/ID transponder is approached. More specifically, FIG. 7 shows an RF/ID transponder 10 including a housing 14 and base plate 12 as described above with respect to FIGS. 1 and 2. The RF/ID transponder 10 includes a dipole antenna arranged as in FIG. 4, so that it produces the RF radiation pattern shown. The RF/ID transponder 10 is disposed on a pallet 62 along with a crate 60. A forklift 72 includes an RF/ID interrogator 70 mounted on a front surface thereof. The RF/ID interrogator 70 emits a radiation pattern that extends in front of the forklift 72. As illustrated in FIG. 7, the radiation pattern of the RF/ID interrogator 70 will detect one of the squinted beams of the RF/ID transponder 10 from a distance as it approaches the transponder. At a minimum, it should be appreciated that the RF/ID transponder 10 will be detected at a greater read distance than would have been possible with a radiation pattern of FIG. 3. Moreover, the RF/ID transponder 10 having three high gain beams will likely have a higher capture rate than a RF/ID transponder with only a single high gain beam, as there is a greater likelihood that an RF/ID interrogator will encounter at least one of the beams.

Figure 8:
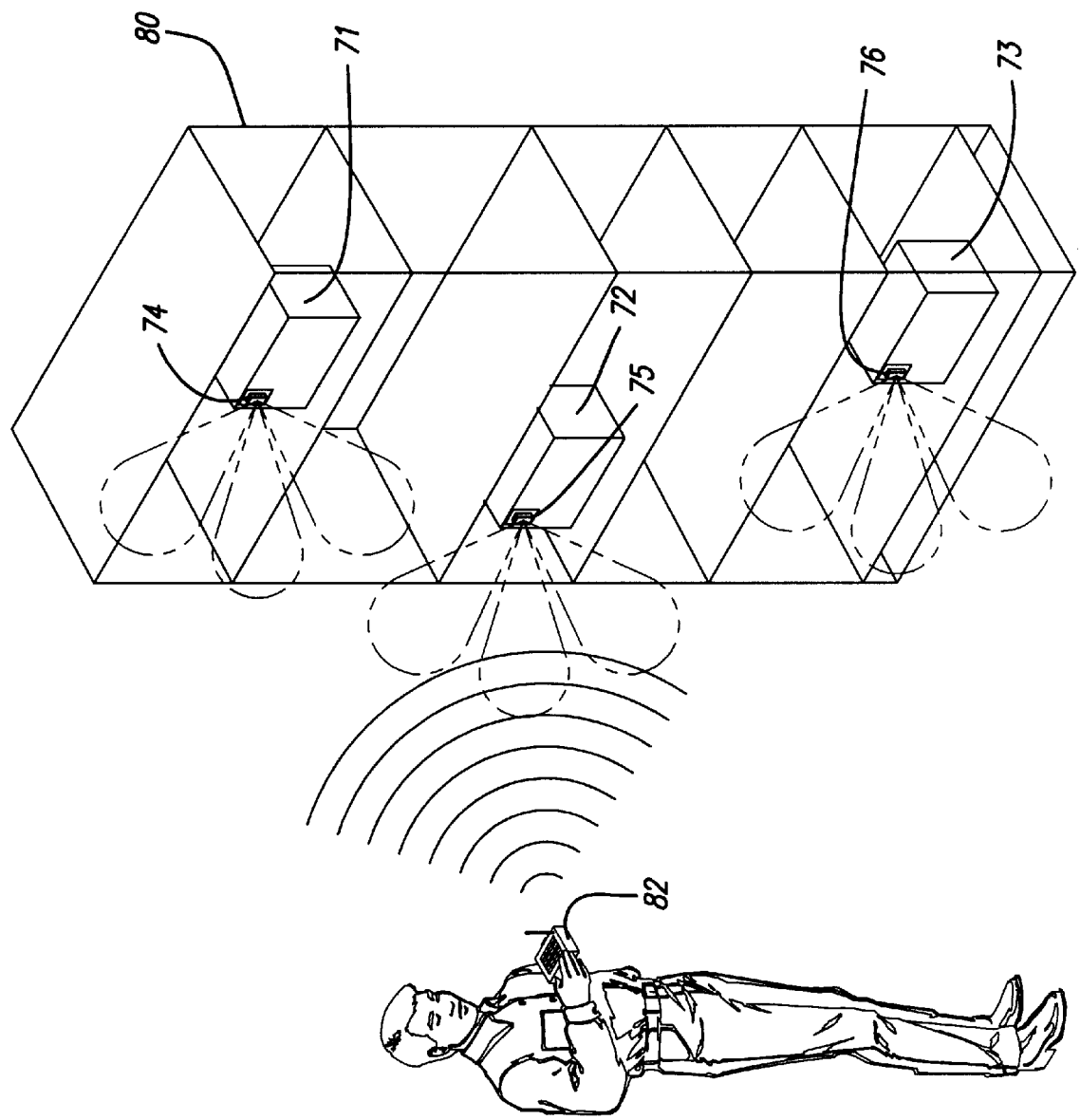
FIG. 8 is a perspective view of an RF/ID system including plural vertically disposed RF/ID transponders being interrogated by an RF/ID interrogator.

FIG. 8 shows another way in which the squinted beams of present invention can improve the reading range of an RF/ID system. In FIG. 8, three separate packages 71, 72, 73 are disposed on respective shelves of a storage rack 80. The first package 71 is disposed above the line of sight of a warehouseman, the second package 72 is disposed on the line of sight of the warehouseman, and the third package 73 is disposed below the line of sight of the warehouseman. The three packages 71, 72, 73 are provided with individual RF/ID transponders 74, 75, 76, respectively, constructed in accordance with the foregoing teachings of the present invention. The RF/ID transponders are disposed on vertical surfaces of the packages such that, for each one of the transponders, a first squinted beam points upward, a second squinted beam points downward, and a center beam points level to the line of sight of the warehouseman. The warehouseman has an RF/ID interrogator 82 with an interrogating beam extending along the warehouseman's line of sight. Consequently, the RF/ID interrogator 82 will detect the downward-directed squinted beam of the RF/ID transponder 74, the center beam of the transponder 75, and the upward-directed squinted beam of the RF/ID transponder 76.

An additional advantage of the present invention is that the plural beams of the RF/ID transponder may permit an RF/ID interrogator to determine the relative direction of movement of the transponder. More specifically, an RF/ID interrogator may be positioned such that it detects two or more of the RF/ID transponder beams in succession. By controlling the timing or phase of data transmissions by the RF/ID transponder, the RF/ID interrogator may be adapted to discriminate between signals transmitted on each of the two squinted beams and the center beam. By determining the order in which the signals from the respective beams are received, the RF/ID interrogator can ascertain the direction of movement of the RF/ID transponder. For example, an RF/ID interrogator may be mounted above a doorway through which pallets are routinely transported. The pallets may each be equipped with an RF/ID transponder that radiates plural beams as discussed above. The RF/ID interrogator will detect each of the three high gain beams in succession as the pallet is transferred through the doorway. By discriminating the signals from the three beams, the RF/ID interrogator can ascertain the direction of travel of the pallet through the doorway.

Having thus described a preferred embodiment of a RF/ID transponder with squinted beam using dipole-over-ground plane antenna, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A RF/ID transponder, comprising:
   an integrated circuit package;
   a dipole antenna coupled to said integrated circuit package, said dipole antenna having a length greater than one-half wavelength of a electromagnetic wave having a nominal frequency within an operating frequency band of said RF/ID transponder;
   a base plate providing an electrically conductive ground plane, said integrated circuit package and said dipole antenna being parallel to and spaced from said ground plane by a predetermined distance, said dipole antenna providing a radiation pattern that includes at least first and second squinted beams extending at respective acute angles relative to a vector defined normal to said conductive ground plane.

2. The RF/ID transponder of claim 1, further comprising a housing attached to said base plate, said integrated circuit package and said dipole antenna being supported by said housing.

3. The RF/ID transponder of claim 2, further comprising a substrate mounted to said housing and carrying said integrated circuit package and said dipole antenna.

4. The RF/ID transponder of claim 2, wherein said housing further encloses said integrated circuit package and said dipole antenna.

5. The RF/ID transponder of claim 1, wherein said length of said dipole antenna is approximately one and one-half wavelengths of said nominal frequency.

6. The RF/ID transponder of claim 1, wherein said length of said dipole antenna is an odd multiple of one-half wavelength of said nominal frequency.

7. The RF/ID transponder of claim 1, wherein said radiation pattern further includes at least one center beam extending along said vector defined normal to said conductive ground plane.

8. The RF/ID transponder of claim 1, wherein an impedance of the dipole antenna is adjusted by modifying at least one of said predetermined distance between the dipole and the conductive ground plane, and size of the conductive ground plane.

9. The RF/ID transponder of claim 1, wherein said base plate is comprised of metal.

10. The RF/ID transponder of claim 9, wherein the metal is selected from a group consisting of aluminum, steel, brass, titanium, and copper.

11. The RF/ID transponder of claim 1, wherein a length dimension of said base plate is at least as great as said length of said dipole antenna.

12. The RF/ID transponder of claim 1, wherein said dipole antenna is spaced above said conductive ground plane at a distance of approximately 6 percent to 12 percent of said wavelength.

13. The RF/ID transponder of claim 1, wherein said acute angles are approximately 45° from said vector in either direction.

14. The RF/ID transponder of claim 1, wherein said integrated circuit package further includes at least a memory and an RF modulator.

15. A RF/ID transponder, comprising:
   an integrated circuit package; and
   means for radiating RF energy from said integrated circuit package in a radiation pattern that includes at least three distinct beams extending in different relative directions.

16. The RF/ID transponder of claim 15, wherein said radiating means further comprises:
   a dipole antenna coupled to said integrated circuit package, said dipole antenna having a length greater than one-half wavelength of an electromagnetic wave having a nominal frequency within an operating frequency band of said RF/ID transponder; and
   a base plate providing an electrically conductive ground plane, said base plate being disposed a predetermined distance from said dipole antenna.

17. The RF/ID transponder of claim 16, further comprising a housing attached to said base plate, said integrated circuit package and said dipole antenna being supported by said housing at said predetermined distance from said conductive ground plane.

18. The RF/ID transponder of claim 17, further comprising a substrate mounted to said housing and carrying said integrated circuit package and said dipole antenna.

19. The RF/ID transponder of claim 17, wherein said housing supports said dipole antenna above said conductive ground plane at a distance of approximately 6 percent to 12 percent of a wavelength of said nominal frequency.

20. The RF/ID transponder of claim 17, wherein said housing further encloses said integrated circuit package and said dipole antenna.

21. The RF/ID transponder of claim 16, wherein said radiation pattern further includes at least first and second squinted beams extending at respective acute angles relative to a vector defined normal to said conductive ground plane.

22. The RF/ID transponder of claim 21, wherein said acute angles are approximately 45° from said vector in either direction.

23. The RF/ID transponder of claim 16, wherein said length of said dipole antenna is approximately one and one-half wavelengths of said nominal frequency.

24. The RF/ID transponder of claim 16, wherein said radiation pattern further includes at least one center beam extending along said vector defined normal to said conductive ground plane.

25. The RF/ID transponder of claim 16, wherein an impedance of the dipole antenna is adjusted by modifying at least one of said predetermined distance between the dipole and the conductive ground plane, and size of the conductive ground plane.

26. The RF/ID transponder of claim 16, wherein said base plate is comprised of metal.

27. The RF/ID transponder of claim 16, wherein a length dimension of said base plate is at least greater than said length of said dipole antenna.

* * * * *